United States Patent Office 2,744,524
Patented May 8, 1956

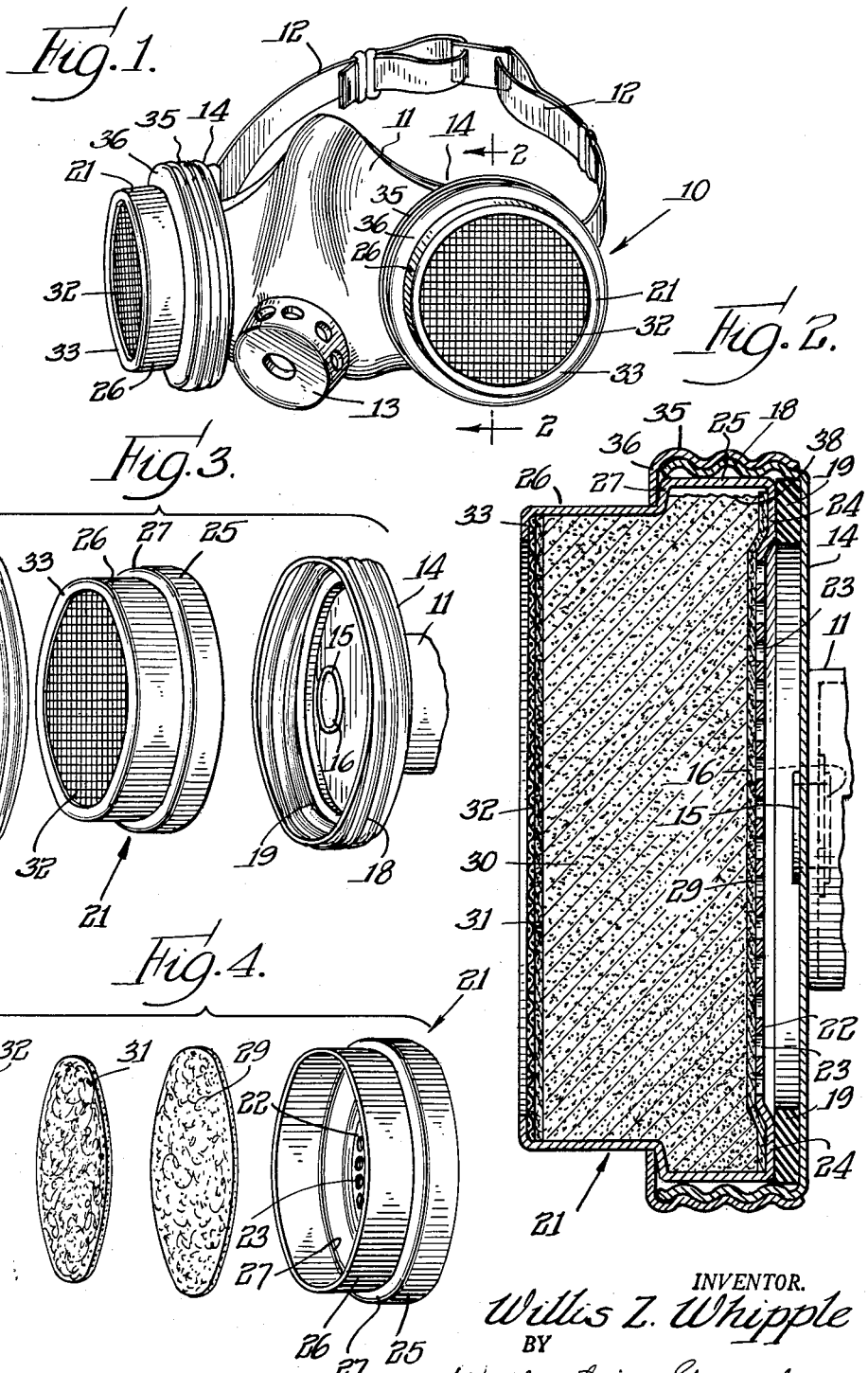

2,744,524

FUME RESPIRATOR WITH CANNISTER HAVING OFFSET WALLS AND RING MOUNTING MEANS

Willis Z. Whipple, Chicago, Ill., assignor to Chicago Eye Shield Company, Chicago, Ill., a corporation of Illinois Application August 8, 1952, Serial No. 303,293

6 Claims. (Cl. 128—146)

This invention relates to a fume respirator and a cartridge therefor.

An object of this invention is to provide an improved cartridge for a fume respirator which is simple in construction, which may be readily manufactured, which is strong and rugged to withstand rough treatment, which effectively prevents leakage caused by channeling of the granular fume absorbing material therein, and which may be readily secured and sealed in the fume respirator.

Another object of this invention is to provide an improved fume respirator incorporating the improved cartridge of this invention wherein the cartridge may be inexpensively and simply removably secured and sealed in the respirator.

Briefly, the fume respirator comprises a facepiece including an exhale valve and a cartridge supporting member having an inhalve valve. The cartridge supporting member is substantially circular and is peripherally provided with a screw threaded flange. An annular resilient gasket is preferably located in the cartridge supporting member.

The cartridge includes a casing member preferably in the form of a cup-shaped member having a substantially circular perforated end wall provided with an annular seating surface and having a substantially cylindrical side wall provided intermediate its ends with an offset bend forming an annular shoulder. The diameter of the side wall between the end wall and the annular shoulder is greater than that between the annular shoulder and the open end thereof. A granular fume absorbing material, such as activated carbon, is packed in and fills the cup-shaped member. A perforate disc, such as a wire screen, is secured in the open end of the cup-shaped member to close the same. Preferably a fibrous disc is located in the casing member at each end thereof to assist in retaining the fume absorbing material in the casing.

The cartridge is received in the cartridge supporting member of the facepiece with the annular seating surface engaging the annular resilient gasket and with the annular shoulder lying adjacent the outer edge of the screw threaded flange. A screw threaded ring is screw threadedly secured to the screw threaded flange and has an internal flange for engaging the annular shoulder of the cartridge for releasably securing the cartridge in the cartridge supporting member and sealing the same against the resilient gasket.

The annular shoulder provides rigidity to the cartridge to withstand rough treatment. It prevents leakage which might be brought about by channeling of the granular fume absorbing material, it acting as a baffle toward this end. It also cooperates with the ring for securing and sealing the cartridge in the cartridge supporting member. In this latter connection the screw threaded flange of the cartridge supporting member and/or the screw threaded ring may be made of considerably smaller dimensions, thus affording a reduction in weight and cost of the respirator.

Further objects of this invention reside in the details of construction of the fume respirator and the cartridge therefor and in the cooperative relationships between the component parts thereof.

Other objects and advantages of this invention will become apparant to those skilled in the art upon reference to the accompanying specification, claims and drawing in which:

Fig. 1 is a perspective view of the fume respirator with the cartridges mounted therein;

Fig. 2 is a vertical sectional view taken substantially along the line 2—2 of Fig. 1;

Fig. 3 is an exploded perspective view illustrating the relationships between the cartridge supporting member, the cartridge and the securing ring;

Fig. 4 is an exploded view of the elements forming the cartridge.

The fume respirator is generally designated at 10. It includes a facepiece 11 preferably formed of molded rubber or the like. The facepiece 11 covers the nose and mouth of the wearer and is held in place by adjustable straps 12. The facepiece 11 is provided with an exhale valve assembly 13 through which the breath is exhaled. A pair of cartridge supporting members 14 are secured and sealed to the facepiece 11 by means of sleeves 15. Inhale valves 16 are associated with the sleeves 15 for inhaling purposes. The respirator thus far described is conventional and is of the double cartridge type. Of course a single cartridge type of respirator may be utilized if so desired.

Upon inhaling, air is drawn through the cartridge supporting member and inhale valve 16, and upon exhaling air is discharged through the exhale valve 13.

The cartridge supporting member 14 is substantially circular in configuration, and is peripherally provided with a screw threaded flange 18. An annular resilient gasket 19 is located in the cartridge supporting member 14 adjacent the flange 18 for sealing purposes.

The cartridge of this invention is generally designated at 21. It includes a casing member preferably made of aluminum or the like. The casing member is preferably made in the form of a cup shaped member having a substantially circular end wall 22. This end wall is provided with a plurality of perforations 23 and it is also formed outwardly to provide an annular seating surface 24. The cup shaped member also has a substantially cylindrical side wall which is divided into two portions having different diameters. The larger portion 25 of the side wall is adjacent the end wall 22 and it joins with the portion of the side wall 26 of smaller diameter through an offset bend forming an annular shoulder 27.

A disc of fibrous material 29 such as felted paper or the like is located against the end wall 22 of the cup shaped member. Granular fume absorbing material such as activated carbon or the like is packed in the cup shaped member against the fibrous disc 29 and substantially completely fills the same. Another disc of fibrous material 31 such as felted paper or the like overlies the granular fume absorbing material 30. A perforate disc 32 preferably in the form of a metallic screen is secured in the open end of the cup shaped member by spinning over the open end as indicated at 33. Cartridges 21 thus formed may be conveniently interchangeably secured in the cartridge supporting members of the fume respirator.

To mount the cartridges 21 in the respirator 10 the larger diameter end of the cartridge is inserted in the cartridge supporting member 14 and the annular seating surface 24 engages the annular resilient gasket 19. A screw threaded ring 35 is then screwed onto the screw threaded flange 18 of the cartridge supporting member 14. This screw threaded ring 35 is provided with an internal flange 36 for engaging the annular shoulder 27 of the cartridge 21 for the purpose of releasably securing the cartridge in the cartridge supporting member and sealing the cartridge against the annular resilient gasket 19. In this respect, the annular shoulder 27 of the cartridge lies adjacent the outer edge of the screw threaded flange 18 so that it may be engaged by the internal flange 36 of the screw threaded ring 35. To replace the cartridge 21 when it becomes spent, all that is necessary is to remove the screw threaded ring 35.

The annular shoulder 27 between the portions 25 and 26 of the side wall of the cartridge lends rigidity to the cartridge so that it can withstand considerable rough treatment. This annular shoulder 27 of the cartridge also prevents leakage which might be brought about by channeling of the granular fume absorbing material. In this connection it is known that the granular fume absorbing material regardless of how well it is packed in the casing member will settle somewhat due to vibration. This settling has a tendency to leave a void at the upper surface of the granular fume absorbing material. This effect is known generally as channeling. In the cartridge of this invention, any channeling or voids will take place only in the large diameter portion of the cartridge; namely, that portion of the cartridge encased within the larger diameter portion 25 of the side wall. This channeling effect is designated at 38 in Fig. 2. The annular shoulder 27 extends below the voids as indicated and acts as a baffle to prevent free transmission of air through the cartridge. Thus, all of the air passing through the cartridge must intimately contact the granular fume absorbing material contained therein and hence air leakage through the cartridge is eliminated. Further, the annular shoulder 27 cooperates with the internal flange 36 of the ring 35 to provide means for securing and sealing the cartridge in the cartridge supporting member. In this latter connection the screw threaded flange 18 of the cartridge supporting member and/or the screw threaded ring 35 may be made of considerably smaller dimensions than if the annular shoulder 27 were not present. This affords a reduction in weight and cost of the respirator.

While for purposes of illustration one form of this invention has been disclosed, other forms thereof may become apparent to those skilled in the art upon reference to this disclosure, and therefore this invention is to be limited only by the scope of the appended claims.

I claim as my invention:

1. A fume respirator comprising a facepiece including an exhale valve and a cartridge supporting member having an inhale valve, said cartridge supporting member being substantially circular and peripherally provided with a screw threaded flange, an annular resilient gasket in the cartridge supporting member, a cartridge including a cup shaped member having a substantially circular perforated end wall provided with an annular seating surface and having a substantially cylindrical side wall provided intermediate its ends with an offset bend forming an annular shoulder, the diameter of the side wall being greater between the end wall and the annular shoulder than between the annular shoulder and the open end thereof, a fibrous disc in the cup shaped member engaging the perforated end wall thereof, a granular fume absorbing material packed in and filling the cup shaped member, a second fibrous disc overlying the fume absorbing material adjacent the open end of the cup shaped member, and a perforate disc overlying the second fibrous disc and secured in the open end of the cup shaped member, said cartridge being received in the cartridge supporting member with the annular seating surface engaging the annular resilient gasket and with the annular shoulder lying adjacent the outer edge of the screw threaded flange, and a screw threaded ring screw threadedly secured to the screw threaded flange and having an internal flange engaging the annular shoulder of the cartridge for releasably securing the cartridge in the cartridge supporting member and sealing the same against the resilient gasket, said annular shoulder providing rigidity to the cartridge, acting as a baffle for preventing leakage due to channeling of the granular fume absorbing material and providing means for securing and sealing the cartridge in the cartridge supporting member.

2. A fume respirator comprising a facepiece including an exhale valve and a cartridge supporting member having an inhale valve, said cartridge supporting member being substantially circular and peripherally provided with a screw threaded flange, an annular resilient gasket in the cartridge supporting member, a cartridge including a cup shaped member having a substantially circular perforated end wall provided with an annular seating surface and having a substantially cylindrical side wall provided intermediate its ends with an offset bend forming an annular shoulder, the diameter of the side wall being greater between the end wall and the annular shoulder than between the annular shoulder and the open end thereof, a granular fume absorbing material packed in and filling the cup shaped member, a perforate disc secured in the open end of the cup shaped member for closing the same, said cartridge being received in the cartridge supporting member with the annular seating surface engaging the annular resilient gasket and with the annular shoulder lying adjacent the outer edge of the screw threaded flange, and a screw threaded ring screw threadedly secured to the screw threaded flange and having an internal flange engaging the annular shoulder of the cartridge for releasably securing the cartridge in the cartridge supporting member and sealing the same against the resilient gasket, said annular shoulder providing rigidity to the cartridge, acting as a baffle for preventing leakage due to channeling of the granular fume absorbing material and providing means for receiving and sealing the cartridge in the cartridge supporting member.

3. A fume respirator comprising a facepiece including an exhale valve and a cartridge supporting member having an inhale valve, said cartridge supporting member being substantially circular and peripherally provided with a screw threaded flange, an annular resilient gasket in the cartridge supporting member, a cartridge including a casing member having substantially circular perforated end walls of different diameters and having substantially cylindrical side wall provided intermediate its ends with an offset bend forming an annular shoulder, the diameter of the side wall being greater between the larger end wall and the annular shoulder than between the smaller end wall and the shoulder, and a granular fume absorbing material packed in and filling the casing member, said cartridge being received in the cartridge supporting member with the larger end wall engaging the annular resilient gasket and with the annular shoulder lying adjacent the outer edge of the screw threaded flange, and a screw threaded ring screw threadedly secured to the screw threaded flange and having an internal flange engaging the annular shoulder of the cartridge for releasably securing the cartridge in the cartridge supporting member and sealing the same against the resilient gasket, said annular shoulder providing rigidity to the cartridge, acting as a baffle for preventing leakage due to channeling of the granular fume absorbing material and providing means for securing and sealing the cartridge in the cartridge supporting member.

4. A cartridge for a fume respirator including a substantially circular cartridge supporting member peripherally provided with a flange comprising a cup shaped member having a substantially circular perforated end wall provided with an annular seating surface and having a substantially cylindrical side wall provided intermediate its ends with an offset bend forming an annular shoulder, the diameter of the side wall being greater between the end wall and the annular shoulder than between the annular shoulder and the open end thereof, a fibrous disc in the cup shaped member engaging the perforated end wall thereof, a granular fume absorbing material packed in and filling the cup shaped member, a second fibrous disc overlying the fume absorbing material adjacent the open end of the cup shaped member, and a perforate disc overlying the second fibrous disc and secured in the open end of the cup shaped member, said cartridge being adapted to be received in the cartridge supporting member with its annular shoulder lying adjacent the outer edge of the flange, said annular shoulder providing rigidity to the cartridge, acting as a baffle for preventing leakage due to channeling of the granular fume absorbing material and providing means for cooperating with the flange for securing the cartridge in the cartridge supporting member.

5. A cartridge for a fume respirator including a substantially circular cartridge supporting member peripherally provided with a flange comprising a cup shaped member having a substantially circular perforated end wall provided with an annular seating surface and having a substantially cylindrical side wall provided intermediate its ends with an offset bend forming an annular shoulder, the diameter of the side wall being greater between the end wall and the annular shoulder than between the annular shoulder and the open end thereof, a granular fume absorbing material packed in and filling the cup shaped member, a perforate disc secured in the open end of the cup shaped member for closing the same, said cartridge being adapted to be received in the cartridge supporting member with its annular shoulder lying adjacent the outer edge of the flange, said annular shoulder providing rigidity to the cartridge, acting as a baffle for preventing leakage due to channeling of the granular fume absorbing material and providing means for cooperating with the flange for securing the cartridge in the cartridge supporting member.

6. A cartridge for a fume respirator including a substantially circular cartridge supporting member peripherally provided with a flange comprising a casing member having substantially circular perforated end walls of different diameters and having a substantially cylindrical side wall provided intermediate its ends with an offset bend forming an annular shoulder, the diameter of the side wall being greater between the larger end wall and the annular shoulder than between the smaller end wall and the shoulder, and a granular fume absorbing material packed in and filling the casing member, said cartridge being adapted to be received in the cartridge supporting member with its annular shoulder lying adjacent the outer edge of the flange, said annular shoulder providing rigidity to the cartridge, acting as a baffle for preventing leakage due to channeling of the granular fume absorbing material and providing means for cooperating with the flange for securing the cartridge in the cartridge supporting member.

References Cited in the file of this patent

UNITED STATES PATENTS

| | | |
|---|---|---|
| 533,854 | Loeb | Feb. 5, 1895 |
| 610,914 | Moody | Sept. 20, 1898 |
| 2,019,928 | Punton | Nov. 5, 1935 |
| 2,505,173 | Conley | Apr. 25, 1950 |
| 2,577,606 | Conley | Dec. 4, 1951 |
| 2,652,828 | Matheson | Sept. 22, 1953 |